United States Patent
Brewer et al.

(10) Patent No.: US 9,777,772 B2
(45) Date of Patent: Oct. 3, 2017

(54) HIGH CAPACITY AXIAL CYLINDRICAL ROLLER CAGE

(71) Applicant: Schaeffler Technologies AG & Co. KG, Herzogenaurach (DE)

(72) Inventors: Ron Brewer, Mooresville, NC (US); David McSwain, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 35 days.

(21) Appl. No.: 14/854,548

(22) Filed: Sep. 15, 2015

(65) Prior Publication Data
US 2016/0131187 A1 May 12, 2016

Related U.S. Application Data

(60) Provisional application No. 62/076,782, filed on Nov. 7, 2014.

(51) Int. Cl.
*F16C 33/46* (2006.01)
*F16C 19/30* (2006.01)

(52) U.S. Cl.
CPC ...... *F16C 33/4676* (2013.01); *F16C 33/4629* (2013.01); *F16C 33/4635* (2013.01); *F16C 19/30* (2013.01)

(58) Field of Classification Search
CPC ........ F16C 19/30; F16C 19/305; F16C 19/32; F16C 33/4676; F16C 33/4629; F16C 33/4635
See application file for complete search history.

(56) References Cited

U.S. PATENT DOCUMENTS

| | | | | | |
|---|---|---|---|---|---|
| 3,477,773 | A | * | 11/1969 | Altson | F16C 19/364 384/576 |
| 3,876,267 | A | * | 4/1975 | Schaeffler | B29C 45/2628 384/623 |
| 4,288,129 | A | * | 9/1981 | Ryanen | F16C 33/4635 384/576 |
| 4,462,643 | A | * | 7/1984 | Gilbert | F16C 33/4635 384/548 |

(Continued)

FOREIGN PATENT DOCUMENTS

JP 2008163991 A * 7/2008 ............ F16C 19/30
JP WO-2012137788 A1 * 10/2012 ............ F16C 19/305

*Primary Examiner* — Alan B Waits
(74) *Attorney, Agent, or Firm* — Volpe and Koenig, P.C.

(57) ABSTRACT

A roller-cage assembly including rolling elements and a cage is provided. The cage includes crossbars extending between an inner and outer ring that define rolling element pockets. Each of the crossbars is tapered from a larger width at the radially outer ring to a smaller width at the radially inner ring, and is connected to the radially inner ring at a first cross-sectional connection area. The crossbars have a first and second lateral surface for supporting the rolling elements. The first cross-sectional connection area of each of the crossbars has a minimum width and a first height. A maximum distance is defined between outer surfaces of adjacent rolling elements and is greater than zero. The minimum width of the first cross-sectional connection area is greater than the maximum distance defined between outer surfaces of adjacent rolling elements at radially inner ends thereof, and is 30-50% of the first height.

10 Claims, 6 Drawing Sheets

(56) References Cited

U.S. PATENT DOCUMENTS

| | | | | |
|---|---|---|---|---|
| 4,523,862 | A * | 6/1985 | Yasui | F16C 19/364 |
| | | | | 384/564 |
| 5,123,756 | A * | 6/1992 | Amen | F16C 19/36 |
| | | | | 384/551 |
| 5,630,668 | A * | 5/1997 | Ikezawa | F16C 19/30 |
| | | | | 384/527 |
| 6,752,535 | B2 * | 6/2004 | Krochak | F16C 33/547 |
| | | | | 384/623 |
| 7,114,854 | B2 * | 10/2006 | Hayashi | F16C 19/305 |
| | | | | 384/623 |
| 7,134,794 | B2 * | 11/2006 | Obayashi | F16C 19/30 |
| | | | | 384/623 |
| 7,955,001 | B2 * | 6/2011 | Reed | F16C 33/4676 |
| | | | | 384/571 |
| 8,714,832 | B2 * | 5/2014 | Usuki | F16C 33/4635 |
| | | | | 384/572 |
| 8,888,368 | B2 * | 11/2014 | Hsu | F16C 33/506 |
| | | | | 384/44 |
| 9,039,290 | B2 * | 5/2015 | Takahashi | F16C 19/30 |
| | | | | 384/623 |
| 9,140,303 | B2 * | 9/2015 | Dittmar | F16C 33/4635 |
| 2013/0182991 | A1 * | 7/2013 | Takahashi | F16C 19/305 |
| | | | | 384/623 |
| 2014/0016893 | A1 * | 1/2014 | Nishikawa | F16C 19/305 |
| | | | | 384/623 |
| 2016/0040716 | A1 * | 2/2016 | Koganei | F16C 33/6651 |
| | | | | 384/576 |

* cited by examiner

HIGH CAPACITY AXIAL CYLINDRICAL ROLLER CAGE

INCORPORATION BY REFERENCE

The following documents are incorporated herein by reference as if fully set forth: U.S. Provisional Patent Application No. 62/076,782 filed Nov. 7, 2014.

FIELD OF INVENTION

This application is generally related to a rolling bearing assembly, and is more particularly related to a cage for rolling elements in a rolling bearing assembly.

BACKGROUND

Rolling bearing assemblies are used in a wide range of mechanical applications. Known rolling bearing assemblies include a plurality of rolling elements and a cage for supporting the rolling elements. It is desirable to increase the number of rolling elements in rolling bearing assemblies in order to support increased loads. However, this generally means increasing the overall size of the bearing. One alternative way to increase the bearing capacity while maintaining the same size is to decrease the circumferential distance between adjacent rolling element pockets so that additional rolling elements can be added. However, the crossbars cannot be overly thinned because the cage must maintain a certain minimum strength between the crossbar and a radially inner ring. It would be desirable to provide a cage that both maximizes a rolling element capacity and maintains a certain minimum strength requirement between the cage crossbar and the radially inner ring.

SUMMARY

A roller-cage assembly including a cage with an improved rolling element capacity is provided. The roller-cage assembly includes a plurality of rolling elements, and a cage including a radially outer ring, a radially inner ring, and a plurality of crossbars extending therebetween that define a plurality of rolling element pockets. The plurality of rolling elements are retained in the plurality of pockets. Each of the crossbars is tapered from a larger width at the radially outer ring to a smaller width at the radially inner ring, and is connected to the radially inner ring at a first cross-sectional connection area $CA_1$ and is connected to the radially outer ring at a second cross-sectional connection area $CA_2$. Each of the crossbars has a first and second lateral surface for supporting adjacent ones of the rolling elements. The first cross-sectional connection area $CA_1$ of each of the plurality of crossbars has a minimum width $w_1$ and a first height $h_1$. A maximum distance d is defined between outer surfaces of adjacent ones of the plurality of rolling elements and is greater than zero. The minimum width $w_1$ of the first cross-sectional connection area $CA_1$ is greater than the maximum distance d defined between outer surfaces of adjacent ones of the plurality of rolling elements at ends thereof adjacent to the inner ring. The minimum width $w_1$ is 30-50% of the first height $h_1$.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the Drawings.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivates thereof, and words of similar import.

Figure 1:
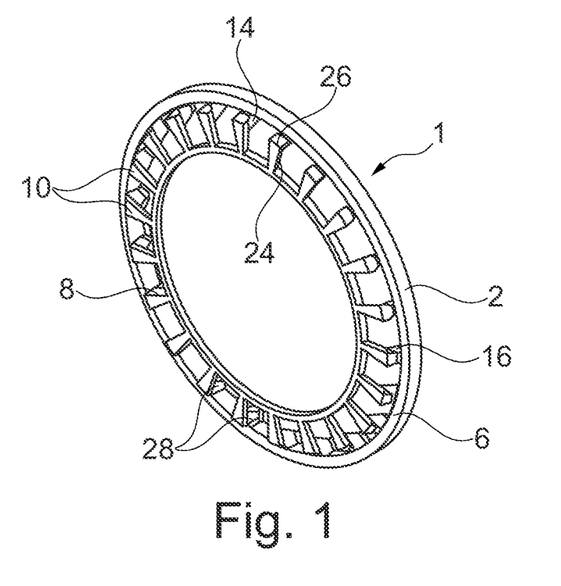
FIG. 1 is a perspective view of a cage of a rolling bearing assembly according to the present invention.
Figure 2:
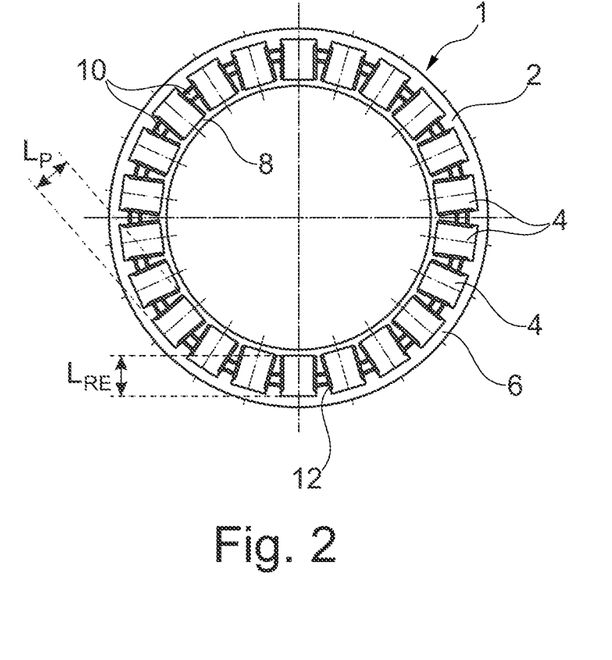
FIG. 2 is a front cross-sectional view of the cage of FIG. 1.
Figure 3:
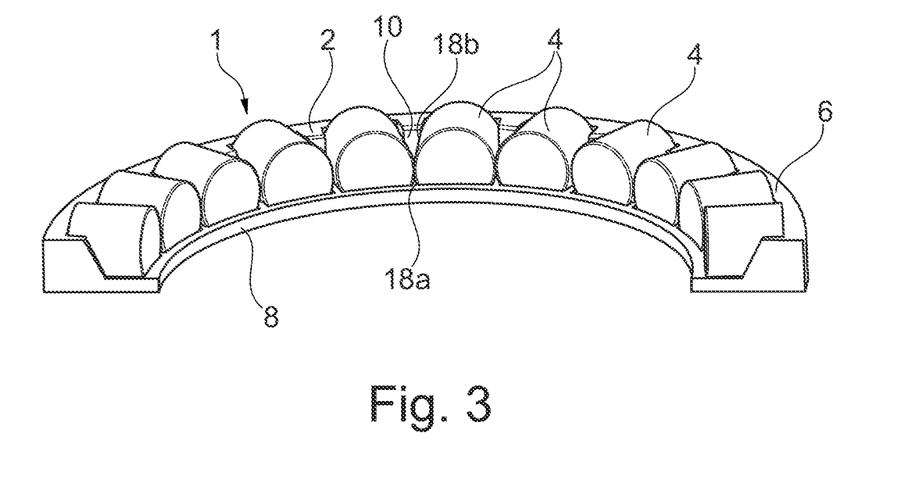
FIG. 3 is a partial perspective view of the cage of FIGS. 1 and 2 with rolling elements in the cage pockets.
Figures 4A, 4B:
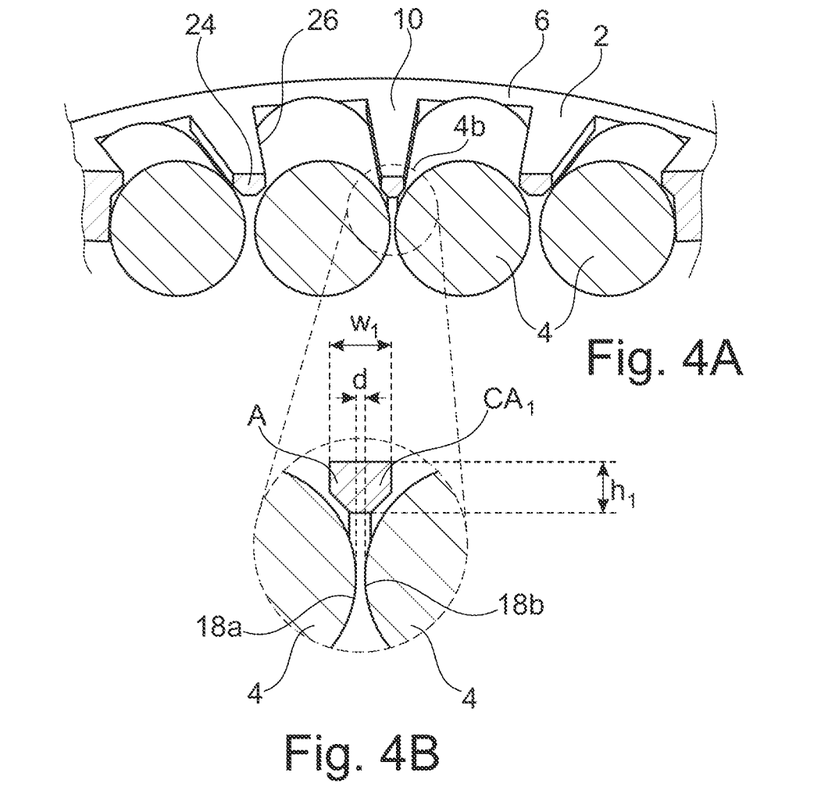
FIG. 4A is a perspective view, partially in cross-section looking at the bottom of the roller-cage assembly at the intersection of the inner ring to the crossbars
FIG. 4B is an enlarged view of the indicated area from FIG. 4A.
Figure 4C:
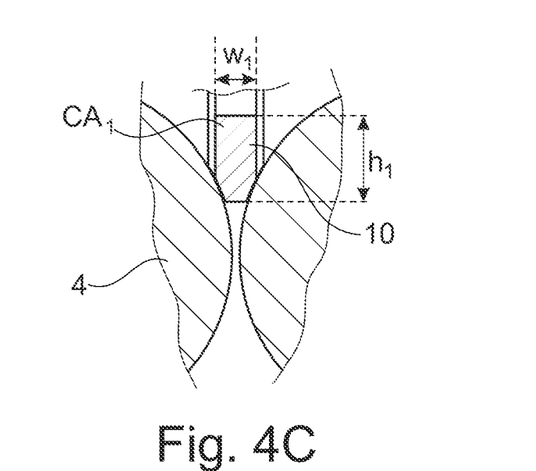
FIG. 4C shows an alternative embodiment of the view of FIG. 4B.
Figure 5:
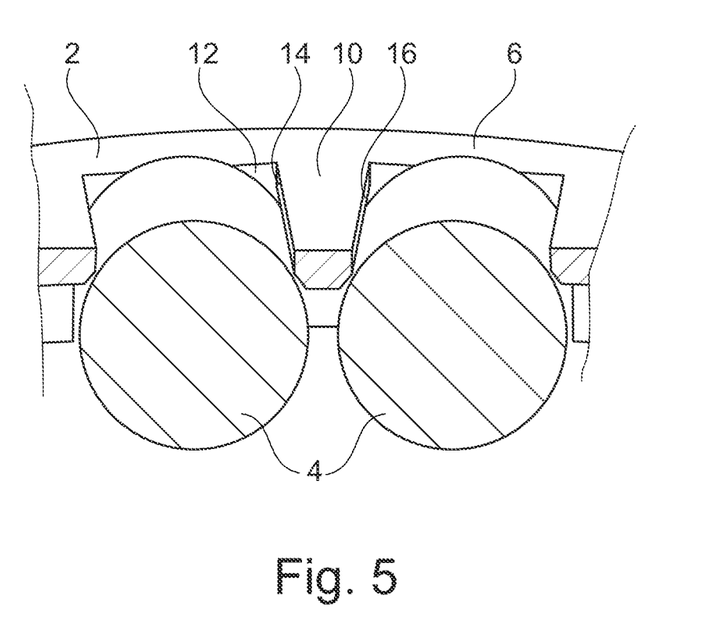
FIG. 5 is a perspective view, partially in cross-section looking at the bottom of the roller-cage assembly at a medial point of the crossbars.
Figure 6:
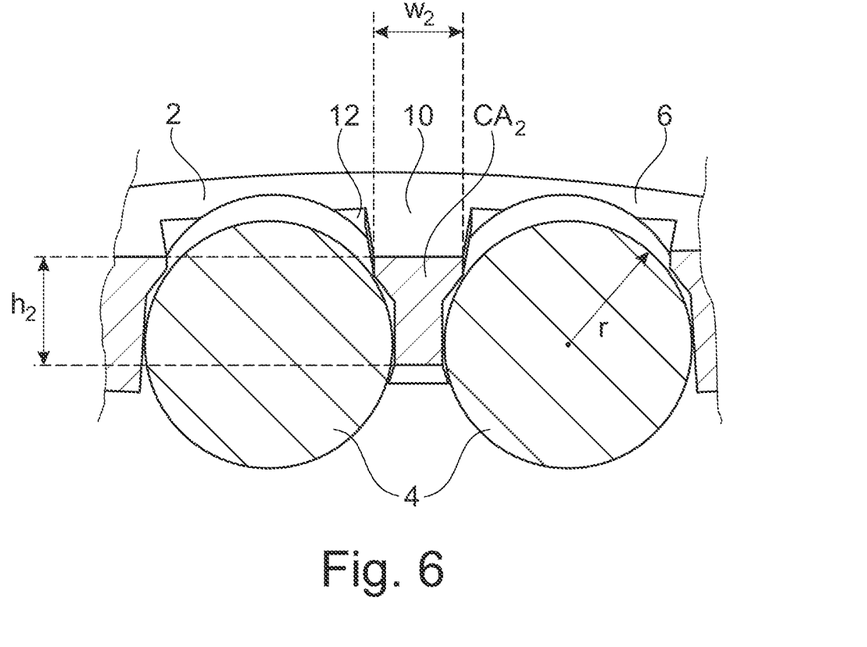
FIG. 6 is perspective view, partially in cross-section looking at the bottom of the roller-cage assembly near the intersection of the crossbars and the outer ring.

As shown in FIGS. 1-3, a roller-cage assembly 1 including a cage 2 with an increased rolling element capacity is provided. The roller-cage assembly 1 includes a plurality of rolling elements 4. The cage 2 includes a radially outer ring 6, a radially inner ring 8, and a plurality of crossbars 10 extending therebetween that define a plurality of rolling element pockets 12, and the plurality of rolling elements 4 are retained in the plurality of pockets 12. In one embodiment, the cage 2 includes twenty two pockets 12. However, the number of pockets will vary depending on the size and capacity of the bearing. In one embodiment, the radially outer ring 6, the radially inner ring 8, and the plurality of crossbars 10 are integrally formed. As shown in FIGS. 4A-6, each of the crossbars 10 is tapered from a larger width at the radially outer ring 6 to a smaller width at the radially inner ring 8. As shown in FIGS. 4A-4C, each of the crossbars 10 is connected to the radially inner ring 8 at a first cross-sectional connection area $CA_1$. As shown in FIG. 6, each of the crossbars 10 is connected to the radially outer ring 6 at a second cross-sectional connection area $CA_2$. FIG. 5 shows a cross-sectional view along a medial portion of the crossbars 10. Each of the crossbars 10 has a first and second lateral surface 14, 16 for supporting adjacent ones of the rolling elements 4. The first cross-sectional connection area $CA_1$ of each of the plurality of crossbars 10 has a minimum width $w_1$ and a first height $h_1$ shown in FIGS. 4B and 4C. In one embodiment, the first height $h_1$ is 20-50% of a diameter of the rolling elements 4. In another embodiment, the first height $h_1$ is 30-40% of the diameter of the rolling elements. A maximum distance d is defined between outer surfaces of adjacent ones of the plurality of rolling elements 4 at least thereof adjacent to the inner ring 8 that is greater than zero.

In one embodiment the maximum distance d is less than or equal to 0.06 inches. As shown in FIG. 4C, the first width $w_1$ of the crossbar 10 at the radially inner ring 8 is 30%-50% of the first height $h_1$. In one preferred embodiment, the first width $w_1$ of the crossbar 10 at the radially inner ring 8 is 50% of the first height $h_1$. At the first cross-sectional connection area $CA_1$ of the crossbar 10 the minimum width $w_1$ is greater than the maximum distance d since the crossbar 10 in the first connection area $CA_1$ is entirely below the center of the rolling elements 4. This allows the maximum distance d between outer surfaces of adjacent ones of the plurality of rolling elements 4 to be reduced so that the limiting factor for the number of rolling elements 4 is the circumference of the radially inner ring 8 at the radially inner side of the pockets 12 divided by the rolling element diameter, plus some tolerance allowance. This maximizes the number of rolling elements 4 that can be installed in the roller-cage assembly 1 for a given size allowing the roller-cage assembly 1 to support increased loads.

In one embodiment, the cage 2 is formed from plastic. In this embodiment, the maximum distance d defined between outer surfaces 18a, 18b of adjacent ones of the plurality of rolling elements 4 at the radially inner ends is 0.06 inches. In one embodiment, the cage 2 is formed from steel. In other embodiments, the cage 2 is formed from bronze, brass, or aluminum. In this embodiment, the maximum distance d defined between outer surfaces 18a, 18b of adjacent ones of the plurality of rolling elements 4 at the radially inner ends is 0.03 inches. Other embodiments of the cage 2 can be formed from aluminum, bronze, brass, and other suitable materials known to those of skill in the art that are capable of supporting rolling elements 4.

Figure 7:
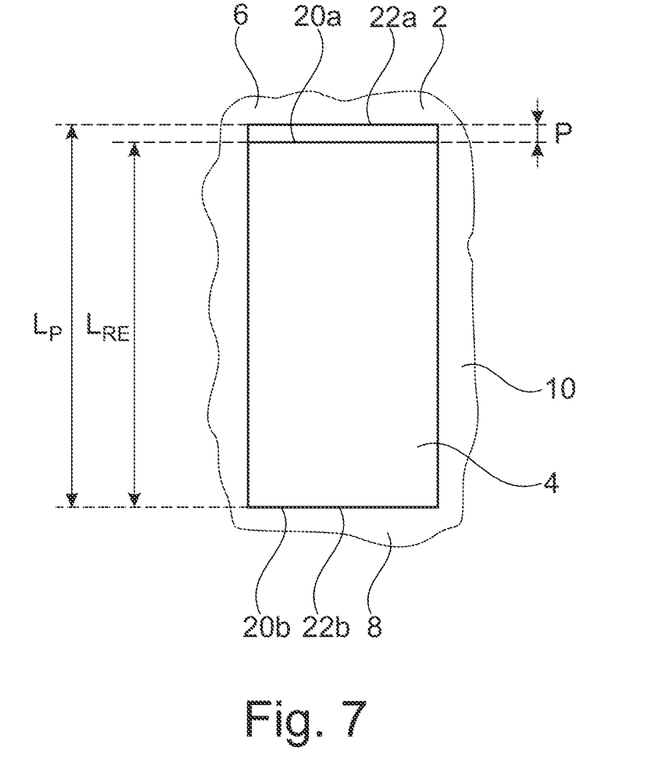
FIG. 7 is a top view of a pocket of the cage of FIGS. 1-6 with a rolling element arranged therein.

As shown in FIG. 7, a length $L_P$ of each of the pockets 12 between the radially inner ring 8 and the radially outer ring 6 is preferably between 101% to 105% of a length $L_{RE}$ of each of the rolling elements 4. A radial play P between axial ends 20a, 20b of each of the rolling elements 4 and axial ends 22a, 22b of each of the pockets is preferably about 0.1 mm. This radial play P is less than the radial play P typically provided in known cages, and the reduced radial play P of the cage 2 prevents the rolling elements 4 from tilting out of the pockets 12.

In one embodiment, the first and second lateral surfaces 14, 16 of the crossbars 10 each define first retention elements 24 in a first axial direction adjacent to the first cross-sectional connection area $CA_1$. The first and second lateral surfaces 14, 16 of the crossbars 10 also define second retention elements 26 in the first axial direction adjacent to the second cross-sectional connection area $CA_2$, and each of the first and second lateral surfaces 14, 16 of the crossbars 10 define third retention elements 28 in a second axial direction adjacent to the second cross-sectional connection area $CA_2$, and the crossbars 10 extend past a center of the rolling elements 4.

Preferably, each crossbar 10 has a stepped profile, and the first cross-sectional connection area $CA_1$ of the crossbars 10 have the first minimum width $w_1$ and the first height $h_1$ at the radially inner ring 8, and the first height $h_1$ is always less than a radius r and located entirely below the center of the rolling elements 4. The second cross-sectional connection area $CA_2$ of the crossbar 10 has a second width $w_2$ and a second height $h_2$ at the radially outer ring 6, and the second height $h_2$ is always greater than the radius r of the rolling elements 4 and extends on both sides of the center of the rolling elements 4.

A method of maximizing a rolling element capacity of a cage 2 for a roller-cage assembly 1 is also provided. The method includes providing a plurality of rolling elements 4. The method includes providing a cage 2 including a radially outer ring 6, a radially inner ring 8, and a plurality of crossbars 10 extending therebetween that define a plurality of rolling element pockets 12. The plurality of rolling elements 4 are retained in the plurality of pockets 12. Each of the crossbars 10 is tapered from a larger width at the radially outer ring 6 to a smaller width at the radially inner ring 8, and is connected to the radially inner ring 8 at a first cross-sectional connection area $CA_1$ and is connected to the radially outer ring 6 at a second cross-sectional connection area $CA_2$. Each of the crossbars 10 defines a first and second lateral surface 14, 16 for supporting the plurality of rolling elements 4. The first cross-sectional connection area $CA_1$ of each of the plurality of crossbars 10 has a minimum width $w_1$. A maximum distance d is defined between outer surfaces 18a, 18b of adjacent ones of the plurality of rolling elements 4. The minimum width $w_1$ of the first cross-sectional connection area $CA_1$ is greater than the maximum distance d defined between outer surfaces 18a, 18b of adjacent ones of the plurality of rolling elements 4 at the radially inner ends thereof. The method includes determining a minimum strength requirement for connection between the plurality of crossbars 10 and the radially inner ring 8 at the first cross-sectional connection area $CA_1$ based on the area of the first cross-sectional connection area $CA_1$ and a material of the cage 2. The minimum strength requirement can be calculated by determining a minimum tensile strength, based on area and cage 2 material, for the connection between the crossbars 10 and the radially inner ring 8. Finite element analysis can also be performed to determine the minimum strength requirement. The method includes maximizing a rolling element capacity of the cage 2 by reducing the maximum distance d defined between the outer surfaces 18a, 18b at the radially inner ends of adjacent ones of the plurality of rolling elements 4. The area $CA_1$ can be adjusted by varying the height $h_1$ and the width $w_1$ as it moves axially away from the center of the rolling elements 4 to achieve the desired strength based on the properties of the material selected for the cage 2.

Having thus described various embodiments of the present roller-cage assembly in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A roller-cage assembly comprising:
   a plurality of rolling elements; and
   a cage including a radially outer ring, a radially inner ring, and a plurality of crossbars extending therebetween that define a plurality of rolling element pockets, the plurality of rolling elements are retained in the plurality of pockets, each of the crossbars is tapered from a larger width at the radially outer ring to a smaller width at the radially inner ring, and is connected to the radially inner ring at a first cross-sectional connection area ($CA_1$) and is connected to the radially outer ring at a second cross-sectional connection area ($CA_2$), each of the crossbars has a first and second lateral surface for supporting adjacent ones of the rolling elements, the first cross-sectional connection area ($CA_1$) of each of the plurality of crossbars has a first width ($w_1$) and a first height ($h_1$), a distance (d) is defined at the radially inner ring between outer surfaces of adjacent ones of the plurality of rolling elements and is greater than zero, the first width ($w_1$) of the first cross-sectional connection area ($CA_1$) is greater than the distance (d) defined between outer surfaces of adjacent ones of the plurality of rolling elements at ends thereof adjacent to the radially inner ring, and the first width ($w_1$) is 30-50% of the first height ($h_1$), and the first cross-sectional connection area ($CA_1$) is defined by: (1) a flat outer surface, (2) two parallel flats extending from the flat outer surface, (3) two angled support surfaces, each angled support surface of the two angled support surfaces extending from a respective flat of the two parallel flats, and (4) an flat inner surface connecting the two angled support surfaces.

2. The roller-cage assembly of claim 1, wherein a length ($L_P$) of each of the pockets between the radially inner ring and the radially outer ring is between 101% to 105% of a length ($L_{RE}$) of each of the rolling elements.

3. The roller-cage assembly of claim 1, wherein a radial play between axial ends of each of the rolling elements and axial ends of each of the pockets is 0.1 mm.

4. The roller-cage assembly of claim 1, wherein the radially outer ring, the radially inner ring, and the plurality of crossbars are integrally formed.

5. The roller-cage assembly of claim 1, wherein the cage is formed from plastic.

6. The roller-cage assembly of claim 1, wherein the cage is formed from steel.

7. The roller-cage assembly of claim 1, wherein the plurality of pockets includes twenty two pockets.

8. The roller-cage assembly of claim 1, wherein the first and second lateral surfaces of the crossbars each define first retention elements in a first axial direction adjacent to the first cross-sectional connection area ($CA_1$), the first and second lateral surfaces of the crossbars each define second retention elements in the first axial direction adjacent to the second cross-sectional connection area ($CA_2$), and the first and second lateral surfaces of the crossbars each define third retention elements in a second axial direction adjacent to the second cross-sectional connection area ($CA_2$).

9. The roller-cage assembly of claim 1, wherein each of the crossbars has a stepped profile, with the first width ($w_1$) and the first height ($h_1$) at the radially inner ring, and the first height ($h_1$) is less than a radius (r) of the rolling elements, and a second width ($w_2$) and a second height ($h_2$) at the radially outer ring, and the second height ($h_2$) is greater than the radius (r) of the rolling elements.

10. The roller-cage assembly of claim 1, wherein the flat outer surface is wider than the flat inner surface.

* * * * *